FIG.1

June 6, 1967    J. M. HUNT    3,324,376
LINEAR D.C. TO A.C. CONVERTER
Filed Dec. 30, 1963    10 Sheets-Sheet 2

INVENTOR.
JOHN M. HUNT
BY
ATTORNEY

June 6, 1967  J. M. HUNT  3,324,376
LINEAR D.C. TO A.C. CONVERTER
Filed Dec. 30, 1963  10 Sheets-Sheet 3

INVENTOR.
JOHN M. HUNT
BY
ATTORNEY

June 6, 1967  J. M. HUNT  3,324,376
LINEAR D.C. TO A.C. CONVERTER
Filed Dec. 30, 1963  10 Sheets-Sheet 6

FIG.9

INVENTOR.
JOHN M. HUNT
BY
ATTORNEY

June 6, 1967 J. M. HUNT 3,324,376
LINEAR D.C. TO A.C. CONVERTER
Filed Dec. 30, 1963 10 Sheets-Sheet 8

FIG.12

INVENTOR.
JOHN M. HUNT
BY
ATTORNEY

FIG.13

June 6, 1967 J. M. HUNT 3,324,376
LINEAR D.C. TO A.C. CONVERTER
Filed Dec. 30, 1963 10 Sheets-Sheet 10

FIG.14

INVENTOR.
JOHN M. HUNT
BY
ATTORNEY

United States Patent Office 3,324,376
Patented June 6, 1967

3,324,376
LINEAR D.C. TO A.C. CONVERTER
John M. Hunt, Hillcrest, N.Y., assignor to General Precision, Inc., Binghamton, N.Y., a corporation of Delaware
Filed Dec. 30, 1963, Ser. No. 334,491
5 Claims. (Cl. 321—9)

This invention relates to method and apparatus for converting electrical signals from direct or continuous form and variable in magnitude and polarity to alternating form, and more particularly to method and apparatus for performing such conversion with good linearity and low distortion so that substantially pure sinusoidal alternating voltages having minimum harmonic content may be obtained without any requirement for expensive and complex filters. In the computer, automatic control and instrumentation arts many requirements arise for apparatus which is capable of linearly converting D.C. to A.C. In most, if not all, such applications, it is desirable that the alternating output voltages be as purely sinusoidal as is economically feasible, i.e., that the alternating voltage consist of a desired fundamental frequency with a minimum of harmonics. As one example, many digital computer applications require that output signals from a digital computer be utilized to control alternating current type indicators or actuators. In practice the digital output signals from the computer usually are converted to D.C. signals by means of any one of a number of known digital-to-analog converters, and then the D.C. signals are converted to alternating form. It is desirable that many indicators and actuators be alternating current types rather than direct current types, particularly where continuously rotatable quantities such as angles must be indicated or applied to control various devices.

A number of D.C. to A.C. converters are known, but few, if any, of them meet the required standards of low-distortion, linearity and economy. Although magnetic amplifiers commonly have been used in the prior art for D.C. to A.C. conversion of computer signals, such amplifiers become extremely expensive if linearity of conversion is required. Electro-mechanical or electronic switches, commonly termed "choppers," followed by filter networks have been widely utilized, and while they are simple and linear, it becomes quite difficult and expensive, requiring complex and expensive filters, to remove the undesired harmonics which cause distortion from the signals provided by choppers. Various D.C.-sensitive modulating resistance systems, such as Hall effect modulators, while being efficiently distortion-free, require complex and expensive auxiliary A.C. to D.C. conversion apparatus to provide feedback signals for linearization. Economy is particularly important, of course, because a very large number of signals frequently are required to be converted.

One form of the invention utilizes a novel technique of "notching" a basic square wave so as to remove much of its unwanted harmonic content, chopping the notched square wave to linearly modulate it, and then filtering other harmonics from the chopper output, to provide an alternating output voltage having very little distortion. The term "notching" is used herein with respect to a waveform to mean switching off the waveform for one or more predetermined periods during each cycle of the waveform, so as to cause a notch or gap to appear in the waveform. The notching process may be used to eliminate all lower order harmonics before chopping, and because the filtering then need eliminate higher order harmonics only, very simple and inexpensive filters may be employed. Other forms of the invention *add* pulses to a basic square wave instead of removing portions of the waveform. Each of the forms of the invention provides signals which may be filtered easily by simple and economic filter circuits. When the invention is utilized to convert a large plurality of D.C. signals simultaneously, most of the required apparatus is common to all of the different channels provided for the different D.C. signals, and hence the cost per channel becomes very low.

Thus it is a primary object of the present invention to provide improved method and apparatus for converting direct voltages to alternating voltages of a desired frequency.

It is a more specific object of the invention to provide improved method and apparatus for converting direct voltages of varying magnitude and polarity to alternating voltages of a desired frequency wherein the amplitude of the alternating voltages varies linearly with variations in the direct voltages, wherein the phase or instantaneous polarity of the alternating voltages vary according to the polarity of the direct voltages, and in particular wherein the alternating voltages produced have low harmonic content.

It is another important object of the invention to provide improved method and apparatus for modulating a direct voltage in such a manner that it may be filtered easily and economically by simple and inexpensive filter means to provide a sinusoidal alternating voltage having low distortion.

It is an additional object of the invention to provide improved apparatus for controlling alternating current actuators and indicators such as synchros from direct current signals.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

As mentioned above, "notching" means switching off a waveform for one or more predetermined portions of each cycle so as to cause a notch to apear in the waveform. The provision of any notch in a square wave removes some of the fundamental frequency of the square wave and either adds to or removes various odd harmonic components, there being no even harmonic components in a square wave, which, as is well known, consists of a rectangular wave is which both positive and negative values have equal time duration. By provision of a plurality of notches in a square wave at selected positions in each cycle of the wave, the distortion, or ratio of lower order odd harmonic content to fundamental content, may be made very low.

Figure 2:
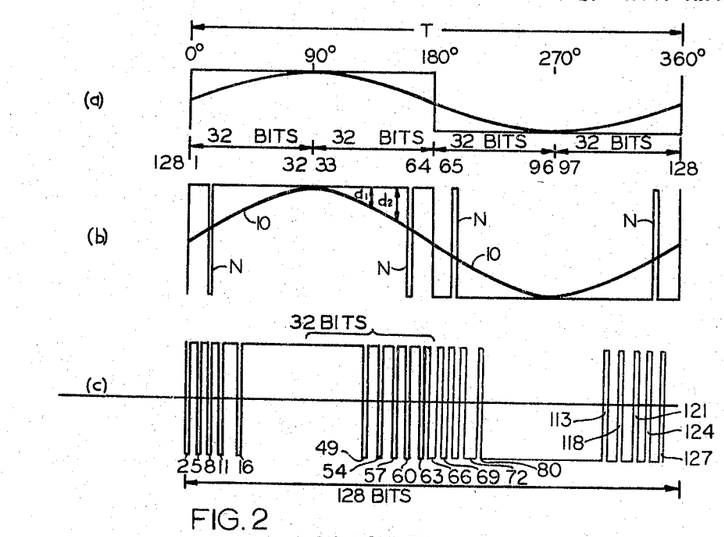
FIG. 2 comprises three elementary waveform diagrams useful in understanding the invention.

One complete cycle of un-notched square wave is shown at $a$ in FIG. 2. The wave is shown as having a positive first half-cycle and a negative last half-cycle. The period of one cycle of the wave is T, and the frequency $f$ of the wave equals $1/T$. The single cycle of the wave is shown divided into four quarters, each of which is 32 equal "bit periods" in length, so that the time for a complete cycle of the square wave is 128 bit periods. The 32 bit periods of the first quarter-cycle are numbered 1 through 32, those of the second quarter cycle numbered 33 through 64, etc.

A similar square wave shown at $b$ in FIG. 2 contains a single notch in each quarter-cycle of the wave, each notch being indiciated by an N. The two quarter-cycles of each half of the square wave are symmetrical about the 90 and 270 degree points, and one-half is an inverted image of the other half, so that a complete analysis of the entire cycle requires the examination in detail of one quarter-cycle only, and only a single quarter-cycle, such as the second quarter-cycle (bit positions 33–64) need be considered in detail.

A sine wave having the same frequency as the square waves at $a$ and $b$ in FIG. 2 is shown superimposed on the square waves. An ideal converter would transform the rectangular wave shown in $a$ to the pure sine wave shown in $a$. Since the two half-cycles of the square wave are of opposite sign and phase-displaced by 180 degrees, it will be appreciated that the square wave consists of a fundamental component plus a plurality of odd harmonics only, since even harmonics cancel out. For the purposes of analysis, one may label the content of the fundamental contained in each half-cycle of the square wave as having a value of 1.00000, and hence the fundamental content in each quarter-cycle is then .500000.

If notches are made in the square waveform, they will change both the fundamental content and the odd harmonic content of the waveform. It will be readily evident from diagrams $a$ and $b$ in FIG. 2 that any notch would intersect and remove some of the desired sine wave and hence decrease the fundamental content of the square wave. While it would thus appear that notching a square wave therefore would *increase* distortion rather than decreasing distortion, it will be seen as the description proceeds, the appropriate notching of the square wave can be so effective in eliminating the troublesome lower order harmonics that conversion may readily be accomplished with very little distortion.

The effects which a given notch have on the fundamental and odd-harmonic contents of a square wave are tabulated in Table I, for each of the 32 notches which may be provided in a 32 bit period quarter-cycle, with odd-harmonics considered up to the 15th order.

TABLE I

| H n/ | | −.5000 | +.16667 | −.10000 | +.07143 | −.05556 | +.04545 | −.03846 | +.03333 |
|---|---|---|---|---|---|---|---|---|---|
| | | Fundamental 1 | 3 | 5 | 7 | 9 | 11 | 13 | 15 |
| 1 | | .04906 | .04891 | .04859 | .04812 | .04750 | .04673 | .04582 | .04477 |
| 2 | | .04894 | .04785 | .04568 | .04250 | .03838 | .03343 | .02778 | .02157 |
| 3 | | .04871 | .04575 | .04003 | .03190 | .02189 | .01062 | −.00118 | −.01279 |
| 4 | | .04835 | .04267 | .03198 | .01757 | .00119 | −.01521 | .02969 | −.04054 |
| 5 | | .04788 | .03866 | .02201 | .00119 | −.01973 | −.03671 | −.04651 | −.04727 |
| 6 | | .04730 | .03381 | .01072 | −.01532 | −.03686 | −.04777 | −.04502 | −.02952 |
| 7 | | .04660 | .02823 | −.00120 | −.03005 | −.04692 | −.04524 | −.02581 | .00353 |
| 8 | | .04579 | .02205 | −.01305 | −.04126 | −.04797 | −.02983 | .00355 | .03475 |
| 9 | | .04487 | .01538 | −.02413 | −.04765 | −.03980 | −.00593 | .03152 | .04797 |
| 10 | | .04384 | .00838 | −.03376 | −.04847 | −.02399 | .01965 | .04708 | .03633 |
| 11 | | .04270 | .00120 | −.04136 | −.04363 | −.00358 | .03964 | .04411 | .00587 |
| 12 | | .04146 | −.00600 | −.04649 | −.03368 | .01752 | .04836 | .02378 | −.02763 |
| 13 | | .04012 | −.01308 | −.04883 | −.01979 | .03526 | .04331 | −.00590 | −.04682 |
| 14 | | .03869 | −.01987 | −.04824 | −.00359 | .04623 | .02594 | −.03327 | −.04175 |
| 15 | | .03716 | −.02623 | −.04476 | .01302 | .04832 | .00119 | −.04754 | −.01505 |
| 16 | | .03554 | −.03203 | −.03860 | .02812 | .04113 | −.02390 | −.04310 | .01944 |
| 17 | | .03384 | −.03713 | −.03012 | .03993 | .02604 | −.04219 | −.02169 | .04386 |
| 18 | | .03205 | −.04143 | −.01984 | .04707 | .00596 | −.04847 | .00825 | .04556 |
| 19 | | .03019 | −.04483 | −.00837 | .04871 | −.01527 | −.04096 | .03495 | .02365 |
| 20 | | .02826 | −.04726 | .00360 | .04465 | −.03357 | −.02180 | .04789 | −.01051 |
| 21 | | .02625 | −.04867 | .01535 | .03537 | −.04542 | .00356 | .04198 | −.03923 |
| 22 | | .02419 | −.04902 | .02619 | .02196 | −.04855 | .02792 | .01955 | −.04762 |
| 23 | | .02206 | −.04832 | .03546 | .00597 | −.04236 | .04433 | −.01057 | −.03134 |
| 24 | | .01989 | −.04656 | .04260 | −.01070 | −.02803 | .04812 | −.03654 | .00117 |
| 25 | | .01766 | −.04380 | .04719 | −.02613 | −.00832 | .03822 | −.04812 | .03308 |
| 26 | | .01539 | −.04009 | .04894 | −.03850 | .01298 | .01745 | −.04077 | .04785 |
| 27 | | .01309 | −.03551 | .04777 | −.04638 | .03180 | −.00829 | −.01736 | .03782 |
| 28 | | .01075 | −.03017 | .04373 | −.04883 | .04451 | −.03167 | .01287 | .00820 |
| 29 | | .00839 | −.02417 | .03707 | −.04557 | .04867 | −.04604 | .03804 | −.02567 |
| 30 | | .00600 | −.01765 | .02819 | −.03698 | .04349 | −.04731 | .04824 | −.04624 |
| 31 | | .00361 | −.01074 | .01762 | −.02407 | .02995 | −.03512 | .03945 | −.04286 |
| 32 | | .00120 | −.00360 | .00599 | −.00835 | .01066 | −.01293 | .01513 | −.01727 |

The notch positions are listed down the left side of Table I and the fundamental and odd harmonics listed across the top of Table I. The total contents of the fundamental and each odd harmonic in a quarter-cycle of a square wave are also shown across the top of Table I, wherein, for example, the total fundamental content in a quarter-cycle of a square wave is .50000, as previously mentioned above. The plus and minus signs in Table I indicate whether given notches will decrease or increase particular harmonics. The relative contents of the various harmonics in a square wave may readily be seen from the following common expression for a square wave:

$$y = \frac{4E}{\pi}\left(\cos\theta - \frac{\cos 3\theta}{3} + \frac{\cos 5\theta}{5} - \frac{\cos 7\theta}{7} \cdots \right)$$

wherein $y$—the ordinate of the wave and $E$ equals the peak value. The total fundamental content is shown as minus .50000 and each number listed in the "1" or fundamental column is plus, indicating that provision of a notch in any bit position will *decrease* the fundamental content. The plus number .04906 for notch No. 1 in the "1" or fundamental column indicates that provision of a notch at the first bit period, i.e., the first 32nd of the quarter-cycle, will decrease the fundamental content from .50000 to .45094, since, .50000 minus .04906 equals .45094. The other numbers in the 1 column of Table I similarly indicate how provisions of notches at other of the 32 bit positions decrease the fundamental content. All of the 32 numbers in fundamental column 1 add up to .50000, the total fundamental content of the quarter-cycle of the square wave, and if notches were provided at all 32 positions, the entire fundamental content would, of course, be removed.

The "3" column of Table I indicates the effect which the various notches have on the 3rd harmonic content of the quarter-cycle of the square wave. The total 3rd harmonic content of the quarter-cycle is shown to be plus .166667. Since notch positions 1 through 11 in the "3" column have positive signs and notch positions 12 through 32 in the "3" column have negative signs, the provision of a notch in any one of the first eleven bit periods will increase 3rd harmonic content and the provision of a notch in any one of the 12th through 32nd positions will decrease 3rd harmonic content. Again, all of the numbers in the "3" column add up to .16667, the total third harmonic content of a quarter-cycle of a square wave. The effects of the notches for other odd harmonics, up to those of 15th order, as shown similarly in Table I.

It will be seen from the above, and by consideration of Table I, that by provision of notches at selected positions, the harmonic content of a square wave may be altered in known manner. Notching may be accomplished by mere switching, and switching may be accomplished electronically with great timing accuracy and without great expense. While the invention may be utilized to provide signals which intentionally include substantial amounts of various selected harmonics, the most usual requirement is for substantially pure sine waves including a minimum amount of odd harmonics and a maximum amount of fundamental, and the following exemplary system indicates one set of notches which have been shown to be effective toward this purpose.

The exemplary system provides five notches, in the 17th, 22nd, 25th, 28th and 31st bit periods of the second quarter-cycle of the square wave, and five similarly appropriate notches at five bit positions of each of the other quarter-cycles of the square waveform. A waveform with such notches is shown at $c$ in FIG. 2. The 17th, 22nd, 25th, 28th and 31st bit positions in the second quarter-cycle itself will be seen to be the 49th, 54th, 57th, 60th and 63rd positions in the entire 128 bit position cycle. The notches in the first quarter-cycle are spaced symmetrically about the 90 degree point as shown, at the 2nd, 5th, 8th, 11th and 16th bit positions, and inverted image bit positions provided in the third and fourth quarter-cycles occur at the following bit positions: 66, 69, 72, 75, 80, 113, 118, 121, 124 and 127. Thus twenty-notches are provided in each complete cycle of the desired alternating voltage. As shown by Table I, the total 3rd harmonic content of the quarter-cycle of a square wave is +.16667. Provision of the five selected notches decreases the 3rd harmonic content as follows:

| | |
|---|---|
| Bit 17 | −.03713 |
| Bit 22 | −.04902 |
| Bit 25 | −.04380 |
| Bit 28 | −.03017 |
| Bit 31 | −.01074 |
| Sum | −.17086 |
| Original 3rd harmonic | +.16667 |
| Remaining 3rd harmonic after notching | −.00419 |

It may be noted that the provision of the five notches in those five bit positions actually slightly overcorrects for third harmonic, since the negative sum of the five notch contributions (−.17086) is slightly greater than the original 3rd harmonic content (+.16667). Ideally the contributions of the selected five notches would add up to exactly −.16667. To the extent the sum of the notch contributions exceeds −.16667, the notches are effectively re-inserting 3rd harmonic which is 180 degrees out-of-phase with the original third harmonic component.

In similar fashion the amount by which the various other odd harmonics may be calculated from Table I, and the other harmonic contents will be found to have been changed to the following amounts:

| | |
|---|---|
| 3rd | .00419 |
| 5th | .00461 |
| 7th | .03429 |
| 9th | .01193 |
| 11th | .00261 |
| 13th | .03640 |
| 15th | .02799 | and the fundamental content will be found to be reduced from .50000 to .40995. It will be noted that the notch positions have been selected so as to provide considerably higher percentages for some of the higher order harmonics, and that the lowest order harmonics, notably the 3rd and 5th harmonics, have been markedly decreased. Now if the notched square wave is fed to a very simple and inexpensive filter, the higher order harmonics easily may be attenuated to where they become negligible, thereby providing an output alternating voltage having very little harmonic content. The filter is designed so as to attenuate the fundamental frequency very little and hence the lower order harmonics are also attenuated little by the filter, but since the notching process greatly decreased the lower order harmonic content prior to filtering, appreciable filtering of the lower order harmonics is no longer necessary.

Now some of the outstanding advantages of the invention may be readily appreciated. Prior art systems using a chopped square wave require a filter which greatly attenuates the 3rd and all higher harmonics compared to attenuation of the fundamental. Such prior art filters have been very expensive, they have required critical components and frequent adjustment, they have wasted gain and picked up noise, they have had poor stability and reliability and their phase shift has been difficult to control. Because notching in accordance with the invention allows one in effect to shift the harmonic content away from the fundamental, one may use simple and inexpensive filters having good stability and easily predictable phase shift.

Figure 3:
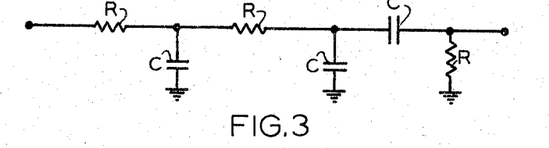
FIG. 3 is an electrical schematic diagram of a simple filter circuit which may be used in connection with the invention.

Shown in FIG. 3 is a simple filter designed for use with the exemplary five-notch system discussed above. The filter will be seen to consist of two low-pass sections followed by one high-pass section. In the simple filter of FIG. 3 all resistances R are equal, all capacitances C are identical and RC times $s$ equals 2.5 where $s$ is the Laplacian operator. Table II now set forth illustrates the operating effectiveness of the filter of FIG. 3.

TABLE II

| Harmonic | Fund. | 3rd | 5th | 7th | 9th | 11th | 13th | 15th |
|---|---|---|---|---|---|---|---|---|
| Square wave harm. content | .5000 | .1667 | .1000 | .7147 | .5556 | .4545 | .3846 | .7333 |
| Harm. content after notching | .4099 | .0042 | .0046 | .0343 | .0119 | .0026 | .0364 | .0280 |
| Filter response, $E_{out}/E_i$ | .04 | .01 | .0045 | .0024 | .0016 | .0011 | .0008 | .0006 .175 |
| Filter output ($\times 10^{-4}$) | 164 $f_1$ | .419 $f_3$ | .206 $f_5$ | .81 $f_7$ | .192 $f_9$ | .029 $f_{11}$ | .206 $f_{13}$ | $f_{15}$ |

The percentage total distortion in the output from the filter may be calculated as follows:

$$\text{Percent total distortion} = \frac{\sqrt{f_3^2 \ldots f_{15}^2}}{f_1} \times 100$$

and the total distortion of the exemplary system shown is 0.61%.

Provision of specifically five notches per quarter-cycle specifically at the 17th, 22nd, 25th, 28th and 31st bit positions is not an essential requirement of the invention, as will be shown below, different numbers of notches at a different group of bit positions will also operate effectively. It may be seen from FIGS. 2b and 2c that in selecting notches to provide a sine wave, the spacing of the notches may properly vary substantially in accordance with the difference in amplitude between the square wave and the desired alternating wave, as shown by the dimensions $d_1$ and $d_2$ in FIG. 2(b). Since $d_2$ is greater than $d_1$, the notches are spaced closer together at the abscissa value (bit position) represented by $d_1$. A limit upon the number of notches to be used in a cycle results from the fact that each and every additional notch decreases the fundamental content of the wave, so that after an optimum number of notches are selected, provision of further notches will operate to decrease the ratio between fundamental content and selected harmonic content and make the modulated square waves more difficult to filter rather than easier to filter.

The invention is particularly adaptable in applications where a plurality of direct voltages must be converted to alternating voltages with good linearity, low distortion and good stability. The use of the invention in connection with certain digital computer applications is particularly attractive. Where digital computer outputs are converted to analog form to operate indicators and actuators, it is frequently desirable to use alternating current indicators and actuators, such as synchro systems. Unless the alternating voltages produced from the digital computer output signals are linear, errors will occur unless complex non-linear compensating means are provided. Unless the alternating voltages are essentially distortion-free, heating of the synchros and erroneous indications will result. Stability is essential in order that the systems not require continual manual re-adjustment. In such computer systems, where a large number of synchros or the like are to be used, the use of the invention becomes very economical, since the same logic circuitry of the invention may be used with all modulators, filters and amplifiers, and the cost per single precision synchro drive then becomes considerably lower than previously used methods, such as the use of servomechanisms.

Figure 1:
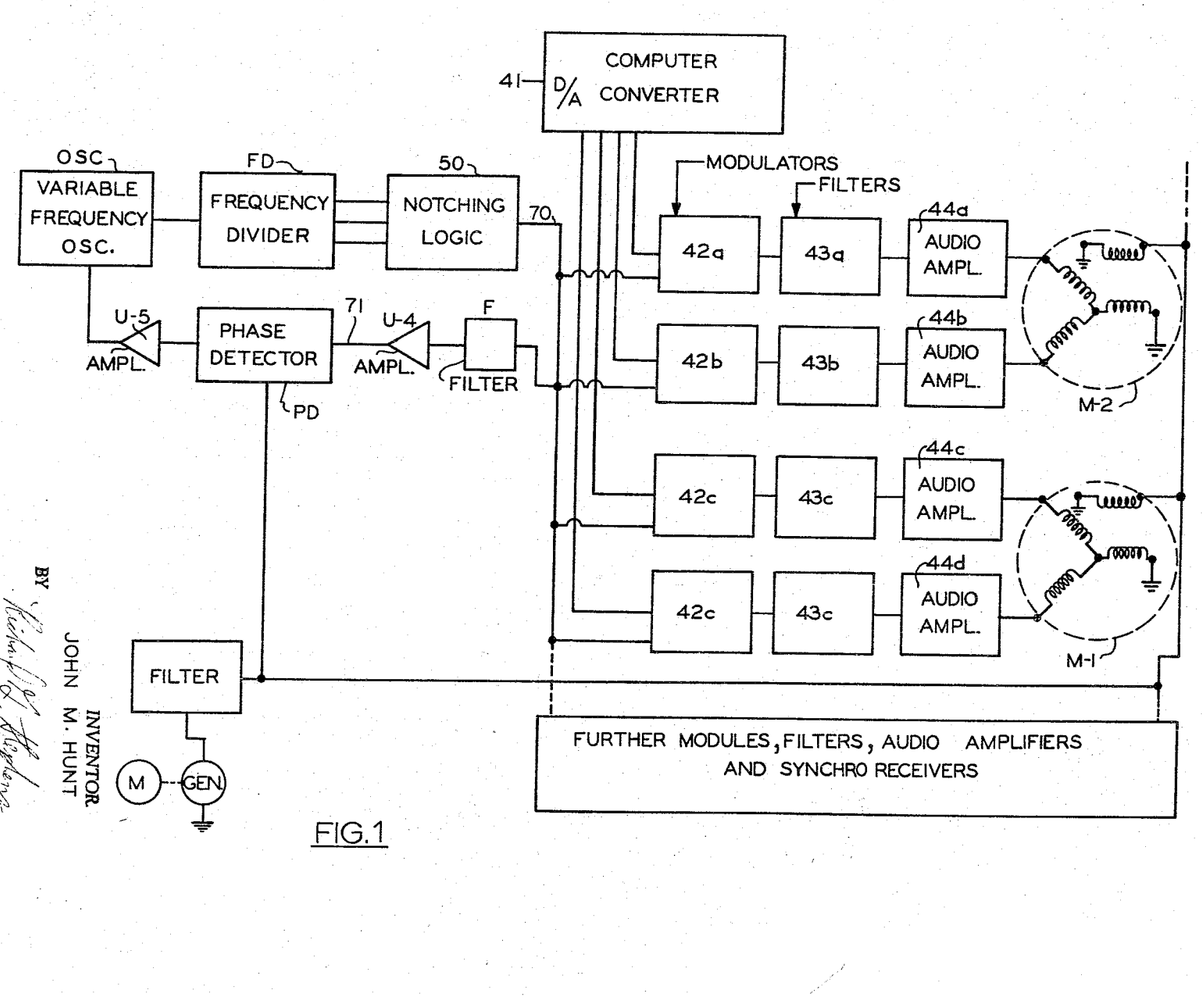
FIG. 1 is an electrical schematic diagram in block form illustrating one application of the invention.

FIG. 1 illustrates a block diagram form of an embodiment of the invention which has been constructed in order that D.C. analog output signals from a flight simulator digital computer (having a digital-to-analog converter) may be used to drive the many synchro receiver motors required to position the many indicators associated with the flight simulator.

A conventional motor-driven 400 c.p.s. generator GEN is connected as shown to energize the single-leg winding of each of the synchro motors, M-1, M-2, etc. Two D.C. analog voltages are provided from the computer D/A converter 41 for each synchro motor to be positioned, and each such analog voltage is routed through a separate modulator 42a, 42b, etc., and a separate filter (43a, 43b, etc.) and an audio amplifier (44a, 44b, etc.), thereby providing outputs to a pair of the three-leg windings of an associated synchro motor. It will be apparent that the filters may be included in the amplifier circuits if desired. In order that the synchro motors operate reliably and accurately, it is necessary that the alternating voltages developed by the modulator and filter units and applied to the synchro windings via the amplifiers both be accurately in phase with the reference voltages applied to the synchros by generator GEN and also be low in harmonic distortion.

Each modulator unit includes electronic switching means controlled by logic circuits to be described, both to convert an applied D.C. analog voltage into a square wave and also to provide a plurality of notches in the square wave. The notched square wave provided by each modulator then may be filtered by a simple filter to provide an alternating voltage having little harmonic distortion. Each modulator unit is connected to be operated by logic circuitry which is common to all of the modulator units. Because the alternating voltages developed by the modulators and filter unit must remain properly in phase with the reference voltages applied to the synchros from generator GEN, the logic circuitry is slaved to the generator output voltage, so that slight deviations in motor-generator speed result in equivalent deviations in the logic circuit operating speed.

Figure 4:
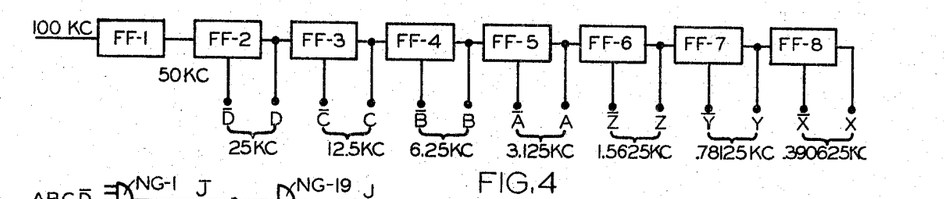
FIG. 4 is a block diagram of a conventional binary counter or frequency divider which may be used as frequency divider FD of FIG. 1.

In the system being described, each cycle of the 400 c.p.s. alternating voltage is again assumed to be divided into 128 bit periods. Each cycle of a 400 c.p.s. signal has a time duration of 2500 microseconds, and hence each bit period has a duration of 19.53 (approximately 20) microseconds. A voltage-controlled variable frequency oscillator OSC of conventional type having a nominal frequency of 100 kc. provides output signals to a frequency divider FD, which consists of a conventional binary counting chain of eight flip-flops, as shown in FIG. 4. In one actual embodiment of the invention oscillator OSC comprised a sine wave oscillator followed by a conventional Schmitt trigger so as to provide rectangular wave signals for application to frequency divider FD. Frequency divider FD halves the frequency of the input square wave in each of its eight stages, providing both high and low outputs from seven of the eight flip-flops, at nominal frequencies indicated in FIG. 4. The output lines (A, $\overline{A}$, B, $\overline{B}$, C, $\overline{C}$, D, $\overline{D}$, X, $\overline{X}$, Y, $\overline{Y}$, Z and $\overline{Z}$) from frequency divider FD are routed to logic circuitry 50 comprising a plurality of NAND gates shown in FIG. 5, to provide output pulses on line 70 (FIG. 1) which are applied to each of the modulator units 42a, etc.

In order to keep the modulating signals on line 70 in proper phase relationship to the 400 c.p.s. generator output voltage, the signals on line 70 are filtered and amplified by filter F and amplifier U-4 to provide an alternating voltage on line 71. The alternating voltage on line 71 and the generator output voltage are phase-compared by a conventional phase discriminator PD, which provides a D.C. output voltage having a polarity and magnitude commensurate with the sense and the amount of the difference in phase between the two alternating voltages applied to it. The D.C. voltage from phase detector PD is amplified by amplifier U-5 and applied to control the frequency of voltage-controlled variable-frequency oscillator OSC. Thus if the phase and/or frequency of the generator output voltage vary, the frequency of OSC is similarly varied, so that the modulating pulses on line 70 remain in phase with the generator voltage.

Voltage-controlled variable-frequency oscillator OSC may comprise any one of a number of known oscillators of such type, and frequency divider FD comprises a chain of completely conventional flip-flops. It will be evident from FIG. 4 that is a signal of exactly 100 kc. is applied to flip-flop FF-1, signals of 390.625 c.p.s. will be provided from flip-flop FF-8, as the eight stages of the frequency divider divide the input frequency by 256, and hence if an input frequency of 102.4 kc. is provided from oscillator OSC, signals of exactly 400 c.p.s. will be provided from flip-flop FF-8.

Figure 5:
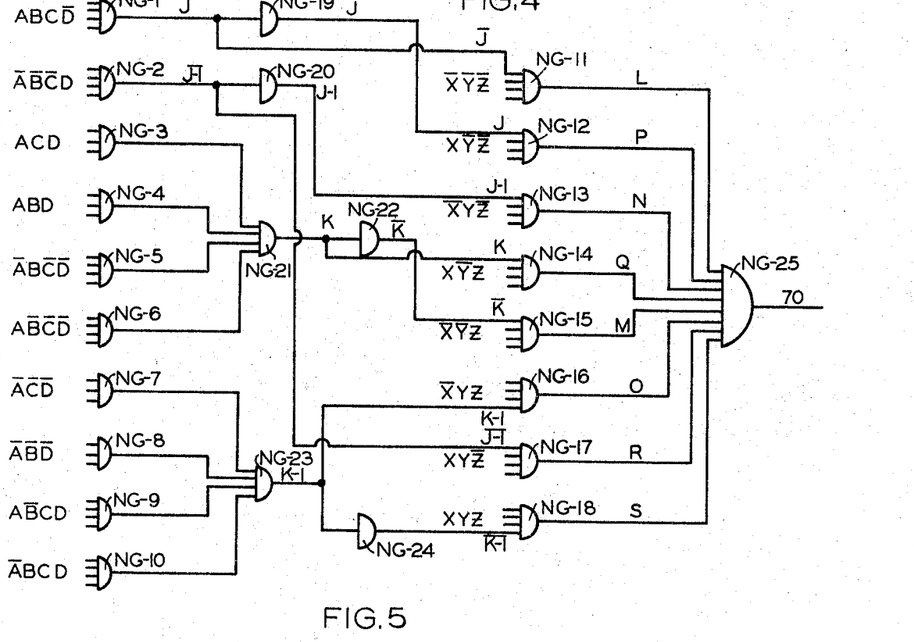
FIG. 5 is a schematic diagram of one form of logic circuitry which may be used as logic network 50 of FIG. 1.
Figure 6:
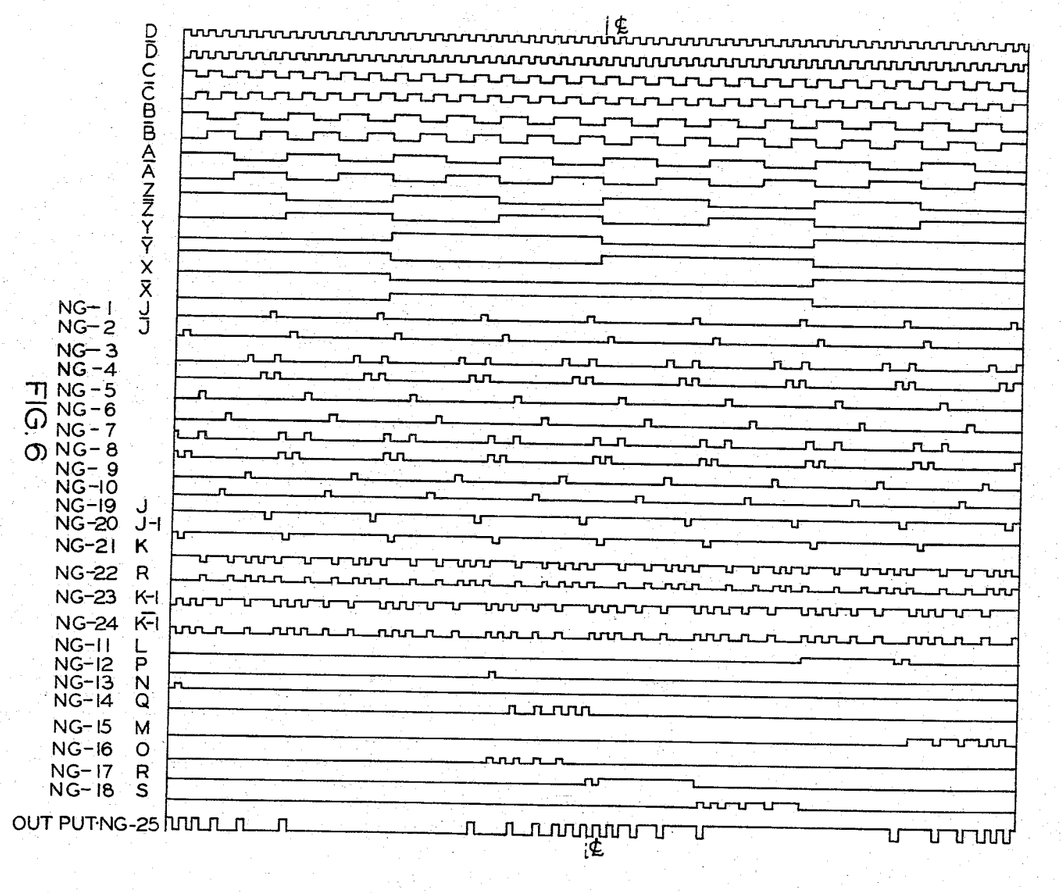
FIG. 6 is a waveform diagram which illustrates the operation of the logic circuit of FIG. 5.

The fourteen output signal lines from frequency divider FD are connected to NAND gates in a manner shown in FIG. 5. The eight higher frequency lines (A, $\overline{A}$, B, $\overline{B}$, C, $\overline{C}$, D, $\overline{D}$,) are connected to ten NAND gates NG-1 through NG-10 shown at the left of FIG. 5 and the six lower frequency lines (X, $\overline{X}$, Y, $\overline{Y}$, Z, $\overline{Z}$) are connected as shown to eight further NAND gates NG-11 to NG-18 shown toward the right side of FIG. 5. The output signal from gate NG-1 is applied directly to gate NG-11. The output signals from NG-1 and NG-2 are inverted by gates NG-19 and NG-20 and applied to gates NG-12 and NG-13, respectively. The output of gate NG-2 is applied to gates NG-17. The outputs of gates NG-3 to NG-6 are applied to NAND gate NG-21, the output of which is applied directly to NG-14 and indirectly to NG-15 after having been inverted by NAND gate NG-22. The output signals from gates NG-7 to NG-10 are applied to gate NG-23, the output of which is applied directly to gate NG-16, and after inversion by gate NG-24, to gate NG-18. The output signals from gates NG-11 to NG-18, which are lettered L through S, all are applied to output NAND gate NG-25. Each of the NAND gates may comprise a conventional commercially-available NAND gate. In FIGS. 5 and 6 negative or "low" signals are treated as "1" bits. A NAND gate, or negative AND gate, will provide an output signal only when all of its input lines are simultaneously low, and the output signal then will be positive, or "high." For example, during the very first bit period shown in FIG. 6, wherein the $\overline{A}$, $\overline{C}$, and $\overline{D}$ signals all are low, a positive output pulse is provided from NAND gate NG-7 to which those three input lines are connected. While FIGS. 4 and 5 illustrate a particular form of gating circuitry operable to provide a desired pulse train for controlling a switch in each of the modulator-filter units, it will be readily apparent to those skilled in the art that a number of changes may be made in the circuit without departing from the invention. For example, while FIG. 4 shows a binary counter, it would be entirely possible to utilize various other types of counters, such as decimal counters and ring counters, with considerably different logic circuits, or even to use re-circulating delay lines, to provide the same pulse train. Furthermore, while the system shown again divides one cycle of the desired alternating wave into 128 periods, the number 128 has no special significance insofar as the broad aspects of the invention are concerned, and other sub-divisions of a cycle may be used. The number 128, and other binary multiples, are, of course, convenient to use when binary counters are used. Table I shows, however, the harmonic effects based on notches which are 1/32 of a quarter-cycle, of 1/128 of a complete cycle, and a different table would be required to illustrate the effects of other cycle subdivisions.

The operation of the logic circuit of FIG. 5 may be readily understood by reference to the waveform diagram of FIG. 6, wherein each of the signals occurring in the apparatus of FIG. 5 during one 128 bit period cycle of a 400 c.p.s. voltage is plotted against time. Considering each quarter-cycle of the alternating voltage to be comprised of 32 bit periods, inspection of the output wave (from gate NG-25) at the bottom of FIG. 6 indicates that notches have been placed at the 15th, 21st, 25th, 28th, 30th and 32nd bit periods of a quarter-cycle of the 400 c.p.s. alternating voltages.

The effectiveness of the six-notch system of FIGS. 5 and 6 may be calculated from Table I by the same procedure as that utilized above. The total third harmonic content in an unmodulated square wave is +.16667. Provision of the six selected notches decreases the 3rd harmonic contents as follows:

Bit 15 ____________________________________ —.02623
Bit 21 ____________________________________ —.04867
Bit 25 ____________________________________ —.04380
Bit 28 ____________________________________ —.03017
Bit 30 ____________________________________ —.01765
Bit 32 ____________________________________ —.00360

Sum ___________________________________ —.17012
Original 3rd harmonic _____________________ +.16667
Remaining 3rd harmonic ___________________ —.00345

Thus it will be seen that the six-notch system decreases 3rd harmonic content before filtering to even a smaller value (.00345) than the specific five-notch system heretofore described, which system reduced the 3rd harmonic content before filtering to a value of .00419, and hence the square wave having six notches per quarter-cycle is even easier to filter than the previous example. The effectiveness of the six-notch system on the other odd harmonics may be readily calculated from Table I. The six-notch system reduces the fundamental (from .50000 to .40098) slightly more than the five-notch system.

In practice of the invention one may utilize a first switch to modulate the input D.C. voltage at 400 c.p.s. to derive a 400 c.p.s. square wave and then use a second switch to further modulate the square wave to insert the desired notches. It is clearly more economical, however, to use a single switch which provides both the 400 c.p.s. switching and the notches, and such a system is illustrated by FIGS. 1, 5, 6 and 7.

It may be noted that the specific modulating logic illustrated in FIGS. 5 and 6 provides six notches per quarter-cycle or 24 notches per complete cycle, whereas the previously described system utilized five notches per quarter-cycle or a total of 20 notches per complete cycle. It is within the scope of the invention, however, to use four or less or to use seven or more notches per quarter cycle. The greater the number of bit periods used to define a fundamental alternating cycle, and to a certain extent, the greater the number of notches provided per cycle, the more easily and effectively the notch positions may be selected so as to remove particular harmonics, with, of course, an increase in equipment. The greater the number of bit positions used to define a cycle, the narrower, of course, each notch becomes. If an extreme number of bit positions per cycle are chosen, extremely fast switching will be seen to be required. The use of too great a number of notches, as mentioned above, operates to decrease fundamental content more than it decreases harmonic content and results in pulse trains which become more difficult to filter.

FIGS. 7(a) through 7(d) illustrate four equivalent switch configurations, each of which may be used to "chop" or modulate an input D.C. voltage. In each of these figures the output voltage $E_{out}$ varies between a first level commensurate with the applied D.C. voltage, when the switch arms are in the positions shown, and a second level, shown as ground, when the switch arms are moved from the positions shown. A variety of known transistor switches and other electronic switches equivalent to those shown in FIGS. 7(a) to 7(d) are known and may be substituted. Electromechanical switches may be used, of course, in those applications where slower switching may be tolerated.

Figure 7A:
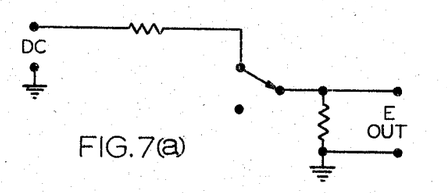
FIGS. 7(a), 7(b) and 7(d) show four basic chopper swtches.
Figure 7B:
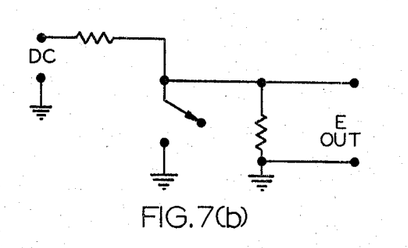
Figure 7C:
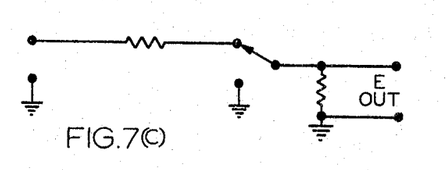
FIG. 7(e) is an electrical schematic diagram of one form of electronic switch which may be used as one of switching units 42a, 42b etc. of FIG. 1.
Figure 7D:
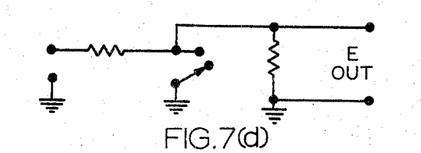
Figures 7E, 8A:
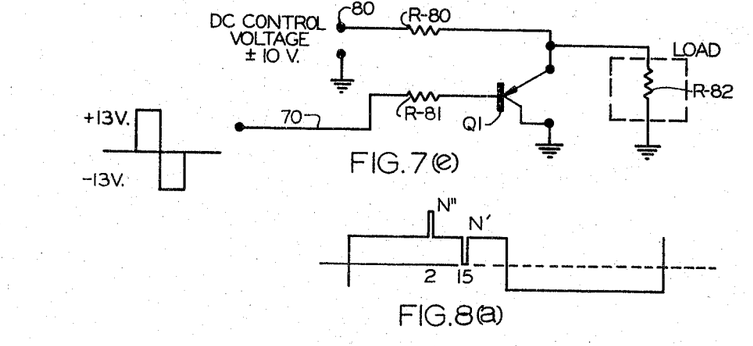
FIGS. 8(a) and 8(b) are elementary waveform diagrams useful in understanding the operation of one alternate embodiment of the invention.

FIG. 7(e) illustrates one exemplary form of transistor switch which has been used in practicing the invention. A PNP-type transistor Q-1 is shown in FIG. 7(e) connected to operate in an inverted configuration. The D.C. voltage to be modulated is connected at terminal 80 and via resistance R-80 (which actually may comprise the source resistance of the D.C. source) to the emitter of transistor Q-1. The collector of transistor Q-1 is connected to ground, and the switching control pulses on line 70 from the logic circuit are applied to the base of transistor Q-1 via a current-limiting resistor R-81. The output voltage is developed between the emitter and ground and applied to the load, which is shown merely as resistor R-82 in FIG. 7(e), but which in practice may comprise a filter circuit (such as that of FIG. 3) or an amplifier input circuit, for example.

In the circuit of FIG. 7(e) the D.C. input voltage varies between plus and minus ten volts, and to insure that the switch turns completely on and completely off the base drive is made to exceed the signal input swing by several volts. When the switching control signal on the base is at its −13 volt level both junctions of the transistor are forward-biased and the transistor is in a saturated condition, effectively shorting the D.C. current to ground so that zero volts (perhaps with several millivolts error) is present across the output terminals and applied to the load. When the switching control signal applied to the base is at its plus 13 volt level, both junctions of the transistor will be reverse-biased, so that the transistor is cut off and acts as an open switch, so that the D.C. current flows through resistors R-80 and the load (R-82).

As mentioned above, the plus and minus signs before the various values shown in Table I indicate whether the provision of a "notch" at a particular bit position will increase or decrease each harmonic. For example, a notch at the 11th bit position will increase 3rd harmonic content, while a notch at the 12th bit position will decrease 3rd harmonic content. Understanding the theory of operation of the next embodiment of the invention will be facilitated by considering the effect of a "negative notch." Providing a notch in a square wave amounts to switching off the square wave for a given period, and as shown above the presence or not of a notch at any given bit position contributes or eliminates known amounts of fundamental and harmonic content. If one provides an extra pulse of square wave height during a given bit period instead of switching off the square wave, the extra pulse will have exactly the opposite effect from a notch. Such a system offers much greater freedom in the selection of bit positions, since both the plus and minus numbers in each harmonic column then may be used.

The system may be better understood by reference to FIG. 8(a). It will be understood from Table I that provision of notch N′ at the 15th bit position in the second quarter-cycle will decrease 3rd harmonic content by a value of .02623, since that value is negative while the total third harmonic content of the original square wave is positive (+.16667). Provision of a notch at any one or more of bit positions 1 through 11 would increase third harmonic content, as the values of the bit contributions for bits 1 through 11 all are positive. However, if the opposite of a notch, i.e. a pulse, is added to the basic square wave at any of those bit positions, the third harmonic content again will be decreased. Thus if the pulse shown at N″ in the second bit position is added to the basic square wave, the third harmonic content will be *reduced* by .04785. Furthermore, while provision of any notch undesirably decreases fundamental content, the provision of pulses instead of notches serves to *increase* fundamental content. Thus it will be seen that the invention embraces the addition of pulses of known length to the basic square wave as well as the provision of notches or gaps in the basic square wave.

As mentioned above, a factor limiting the effectiveness of notching to remove various harmonics is switching speed of the switches used, so that extremely narrow notches, i.e. the subdivision of a cycle into an extreme number of bit positions requires extremely fast switching. Further embodiments of the invention switch relatively wide pulses, so that more slowly-acting switches may be employed.

Figure 8B:
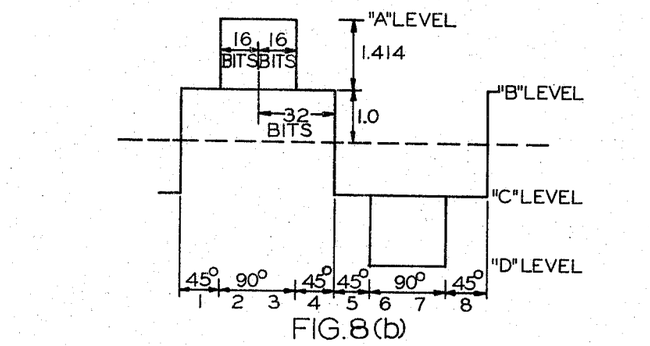
Figure 9:
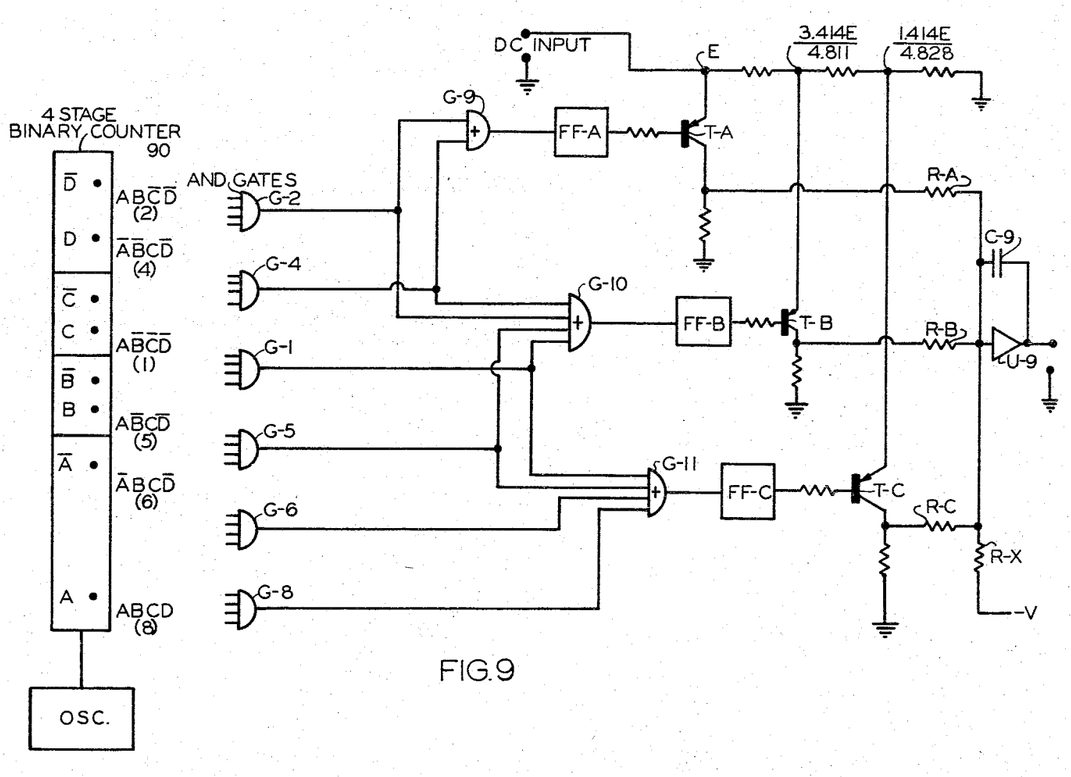
FIG. 9 is an electrical schematic diagram of one alternate embodiment of the invention.

FIG. 8(b) illustrates the waveform effectively provided by the apparatus shown in schematic form in FIG. 9. In FIG. 8(b) a basic square wave having an amplitude of unity (a peak-to-peak amplitude of 2.00) has superimposed upon it two pulses, each of which has an amplitude of 1.414, and each of which has a duration of one quarter-cycle. It has been discovered that superimposition of the pulses upon the basic square wave as shown doubles the value of the fundamental and completely removes the third and fifth harmonics, thereby providing a resultant waveform which is easily filtered. The seventh harmonic is doubled, and hence the ratio of fudamental content to seventh harmonic content is unaffected. As seen in FIG. 8(b), the pulses are superimposed on the basic square wave at the second and third, and sixth and seventh octants of the basic square wave.

If one again assumes each quarter-cycle of the basic square wave to be comprised of 32 bit periods, one may calculate the effect of the superimposed pulses by reference to Table I. Considering the second quarter-cycle of the basic square wave, from 90 to 180 degrees, it will be seen that provision of the superimposed pulse amounts to adding "negative notches" at bit positions No. 1 through 16 inclusive. If one adds up the bit contributions of notches 1 through 16 in the third harmonic colum of notches 1 through 16 in the third harmonic column of Table I, it will be seen that the sum, when multiplied by 1.414, equals the total third harmonic content. Similarly, the sum of the bit contributions of notches 1 to 16 in the fifth harmonic column, when multiplied by 1.414 equals the total fifth harmonic content of the waveform. Thus addition of the superimposed pulses 16 bit periods wide totally eliminates the third and fifth harmonic content.

To provide a waveform such as that shown in FIG. 8(b) four different voltage levels (shown as A, B, C, and D in FIG. 8(b) must be provided for proper time periods. In FIG. 9, oscillator OSC is connected to cycle an ordinary four-stage binary counter 90 repeatedly through its eight count conditions. The output lines of the counter are selectively connected to six AND gates (G-1, G-2, G-4, G-5, G-6 and G-8) as indicated by the letters at each AND gate. Each AND gate feeds into one or more of OR gates G-9, G-10, G-11, and each OR gate in turn is connected to switch a convention bi-stable flip-flop (FF-A, FF-B, FF-C). To provide the waveform of FIG. 8(a), four voltages representing the four levels of the waveform are selectively switched into a summing circuit. The input signals from gates G-2 and G-4 via OR gate G-9 to flip-flop FF-A, switch transistor T-A on at the beginning of the second octant and off at the start of the fourth octant, thereby applying the voltage E to the summing circuit via resistor R-A during the second and third octants of the basic square wave cycle. The input signals from gates G-1, G-2, G-4 and G-5 applied to flip-flop FF-B via gate G-10 switch transistor T-B on for the 1st octant and then off till the 4th octant, on during the fourth octant and then off until the first octant. Thus transistor T-B applied the B level voltage (3.414/4.828 or .707E) during the first and fourth octants via resistor R-B to the summing circuit. The input signals from gates G-1, G-5, G-6 and G-8 switch the C level voltage (.2929E) via resistor R-C to the summing circuit in similar manner during the 5th and 8th octants. During the sixth and seventh octants all three of the transistor switches are open, and hence zero voltage input (the D level) is applied during those two periods. Thus it will be seen that the waveform of FIG. 8(b) is applied to the summing circuit during each cycle of counter 90 through its eight count conditions. The summing circuit is shown as comprising an operational amplifier U-9 into which the A, B and C level voltages are applied through conventional summing resistors R-A, R-B and R-C. The summing circuit is also shown provided with a feedback capacitor C-9 so that the alternating output voltage from U-9 is integrated as well thus shifting the output voltage in phase by 90 degrees. Because all of the three signals applied to the summing and integrating circuit in FIG. 9 are shown as being positive, the output signal from the integrator would contain an increasing negative D.C. component, and to eliminate same, a constant negative voltage is shown being applied to the amplifier input circuit via resistor R-X. If desired, one could instead use four transistor switches, with the T-A and T-B collectors excited at +E and +.707E and the T-C and T-D (not shown) collectors excited at −.707E and −E, but such an arrangement is less desirable because it requires an additional switching transistor and means (such as an amplifier) to invert the D.C. input voltage E. The oscillator in FIG. 9 may be slaved to a reference, if desired, in the same manner as that shown in FIG. 1. To provide a 400 c.p.s. alternating output, the frequency of the oscillator in FIG. 9 would be 3200 c.p.s. It may be noted that the minimum width of the pulses switched by the transistors in FIG. 9 is 312.5 microseconds (as compared to approximately 20 microseconds in FIG. 1), so that switching need not be nearly as fast for a given output alternating frequency, or alternatively, much higher alternating frequencies may be provided using switches of a given speed with the arrangement of FIG. 9.

Fourier analysis teaches one that any complex wave may be broken down into a plurality of sinusoidal components, and further that one may provide a complex wave, such as a square wave, by combining a plurality of selected harmonics. The invention, on the other hand, utilizes a somewhat reversed theorem, and illustrates that a sinusoidal fundamental may be synthesized by combining square waves (or triangular waves) of fundamental and appropriate harmonic repetition rates. Inasmuch as a square wave is known to include all odd-order harmonics, out to the nth order, one might naturally assume that superimposition of plural square waves would provide an extreme number of harmonics and *increase* the ratio between harmonic content and fundamental content, and thereby provide signals which were more difficult to filter. However, as will be demonstrated below, by selecting proper phase relationships and amplitudes, one may superimpose a plurality of square waves in a controlled manner on a basic square wave so that the harmonic contents of the added square waves cancel out those of the basic square wave. If lower order harmonics are removed from a square wave it then becomes very simple and easy to filter the square wave, to provide a substantially pure fundamental alternating voltage. As will become more clear below, triangular waves may be superimposed to achieve similar results.

Figure 10:
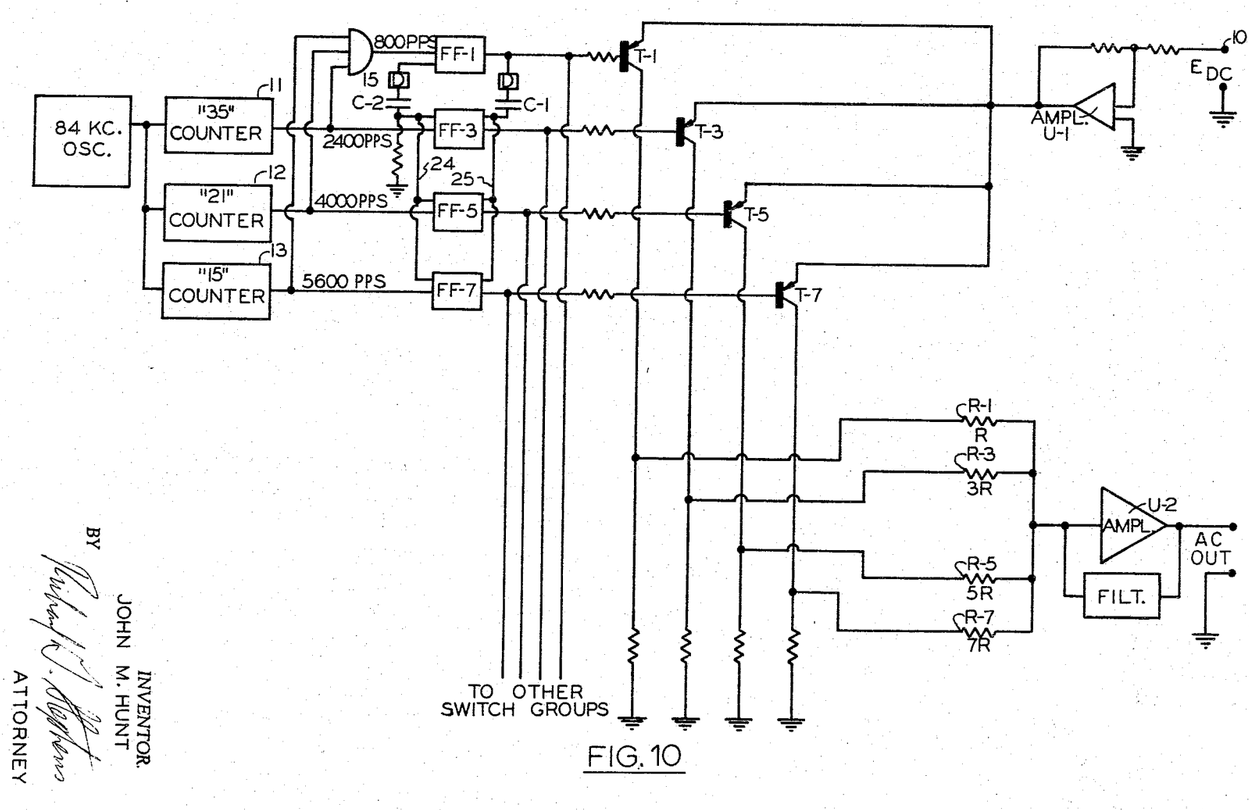
FIG. 10 is an electrical schematic diagram of a further embodiment of the invention.

Referring now to FIG. 10 there is shown an electrical schematic diagram of an apparatus designed to convert a D.C. input signal to a 400 cycle per second alternating voltage. The D.C. input signal, which may vary between plus and minus 10 volts, for example, is applied at terminal 10. The signal is applied directly as shown to the emitters of four switching transistors T-1, T-3, T-5 and T-7. When any one of the transistors is gated on by a negative voltage being applied to its base, the transistor emitter voltage (less an insignificant drop of one or two millivolts) appears on the transistor collector and therefore is applied through a scaling resistance to an amplifier-filter circuit which includes amplifier U-2 and filter F. Whenever an opposite polarity (plus) signal is applied to the base of the transistor, the transistor is cut off, and no signal is applied by that transistor to the amplifier-filter circuit.

The alternating voltage which appears at the output of the amplifier-filter circuit is formed by combining, via four scaling resistances, square wave pulses derived by gating the four transistors on and off at controlled instants. A pulse-generating means is shown as comprising a conventional oscillator OSC designed to oscillate at 84 kilocycles per second, although in certain applications of the invention the oscillator may be a voltage-controlled variable-frequency oscillator, as will be explained below. The frequency of 84 kc. is a suitable frequency for providing a 400 c.p.s. alternating output voltage, and, of course, multiples of that frequency may be used with frequency dividers provided if desired. The output signal from oscillator OSC is applied to counting means shown as comprising three separate counters 11, 12, and 13, all of which are shown in more detail in FIG. 12. Pulse counter 11 is constructed to count through all of its stages in thirty-five counts, counter 11 through its complete cycle in 21 counts, and counter 13 in in 15 counts. Each of the three counters provides an output pulse at the end of its respective counting cycle, and hence counters 11, 12 and 13 will provide 2400, 4000 and 5600 pulses per second. The output signals from the three counters are applied to AND gate 15, and as will become more clear below, 800 output pulses will be provided each second from AND gate 15.

Detailed consideration of the various numbers counted by the counters will make some of the basic principles of this embodiment of the invention more clear. Since pulse-generator OSC provides 84,000 pulses per second, it will be seen that during each cycle of a 400 c.p.s. alternating voltage 210 counts will be applied to counters 11, 12, 13 from the pulse-generating means. The number 210 is the lowest even number which is divisible (without a remainder) by the numbers 3, 5 and 7. The numbers 3, 5 and 7 represent the orders of the harmonics to be removed from the output alternating wave. If one wished to eliminate only 3rd and 5th harmonics, one would multiply the desired alternating frequency by 30 (the lowest even number divisible by 3 and 5) in order to determine the proper pulse rate from pulse-generator OSC, although multiples of such a pulse rate could, of course, be used.

Since 210 counts are applied to the three counters during each single cycle of the desired 400 c.p.s. alternating wave, it will be seen that counter 11 will advance through six of its counting cycles, counter 12 through 10 of its counting cycles and counter 13 through 14 of its counting cycles, during each cycle of the alternating voltage. Further, two pulses will be provided from AND gate 15 during the same time. The three counter output lines and the gate 15 output line are each connected to control a respective bi-stable flip-flop of conventional type. Assume that all of the counters are in their zero position, and that pulses are then applied to them by OSC. After 15 counts an output signal from counter 13 will set flip-flop FF-7, gating on switching transistor T-7. Upon occurrence of the 21st count counter 12 will turn on transistor T-5. Upon occurrence of the 30th count a second pulse from counter 13 will switch flip-flop FF-5 back and turn off transistor T-7. Thus the successive counts from any one of the counters and gate 15 alternatively switch their respective flip-flops back and forth, turning their associated switching transistors on and off. Counters 11, 12 and 13 and gate 15 will be seen to provide output pulses as indicated in the following table.

| Counter: | Output Pulses | | | | | | | | | | | | |
|---|---|---|---|---|---|---|---|---|---|---|---|---|---|
| 13 | 15 | 30 | 45 | 60 | 75 | 90 | 105 | 120 | 135 | 150 | 165 | 180 | 195 | 210 |
| 12 | 21 | 42 | 63 | 84 | 105 | 126 | 147 | 168 | 189 | 210 | | | | |
| 11 | 35 | 70 | 105 | 140 | 175 | 210 | | | | | | | | |
| Gate 15 | 105 | 210 | | | | | | | | | | | | |

Figure 11:
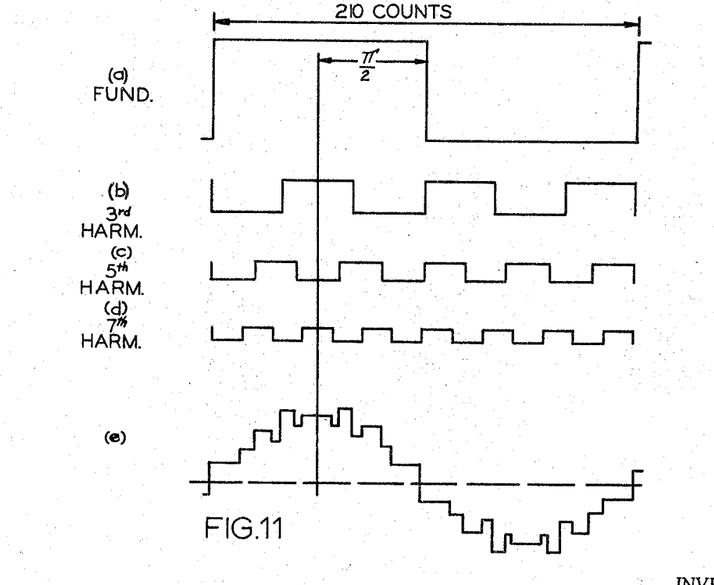
FIG. 11 shows a plurality of waveforms useful in understanding the operation of the apparatus of FIG. 10.

The timing of the switching will be clear from FIG. 11, wherein waveforms *a* through *d* indicate the timing (but not the amplitudes) of the output signals from the four flip-flops FF–1 through FF–7, respectively, during one cycle of the 400 c.p.s. alternating voltage. The output voltage from the flip-flops all are arranged to swing between plus and minus 13 volts, i.e., several volts beyond the maximum plus and minus voltages applied to the emitters, in order to insure that the switches turn "full on" and "full off."

The direct voltage $E_{D.C.}$ to be converted may be amplified by a conventional unity-gain buffer feedback amplifier U–1 if desired. It will be seen that the voltage applied by any switching transistor to its associated scaling resistor therefore is proportional to the input direct voltage being converted. When transistor T–1 is switched on, the input direct voltage is applied through scaling resistor R–1 (having a resistance R) to the amplifier-filter circuit. When transistor T–3 is switched on, the voltage on the T–3 collector is applied through resistor R–3 having three times as much resistance. The voltages from transistors T–5 and T–7 are similarly scaled down in accordance with the order of the harmonics they represent. Thus the waveforms of the currents applied to the amplifier-filter unit through the four scaling resistors are shown to scale as waveforms *a* to *d* in FIG. 11, and the sum of these waveforms is shown at *e* in FIG. 11. As will be shown below, the waveform *e* may be filtered easily and simply by a simple low-pass filter (shown in block form in the U–2 amplifier circuit) since the 3rd, 5th and 7th harmonics have been removed entirely from the wave. The 9th harmonic is also removed automatically, as will be shown below. The output signal then may be further amplified (if desired) and applied to operate an alternating-current actuator or indicator.

The tremendous improvement in the waveform which must be filtered can be better understood and quantitatively demonstrated by the following mathematical analysis. A common expression for the instantaneous magnitude $y_f$ of a square wave of fundamental frequency is as follows:

$$y_f = \frac{4E}{\pi}\left(\cos\theta - \frac{\cos 3\theta}{3} + \frac{\cos 5\theta}{5} - \frac{\cos 7\theta}{7} - \frac{\cos 9\theta}{9} \cdots\right) \quad (1)$$

wherein E is the peak value and the origin is taken at the middle of a pulse, as shown in waveform *a* of FIG. 11. If the origin is taken at a pulse edge, the series contains all odd *sine* terms rather than cosine terms but otherwise is identical.

Since the angle $\theta$ changes three times as fast in a further square wave of three times the frequency of the fundamental, the expression for the further square wave is as follows:

$$y_3 = \frac{4E}{\pi}\left(\cos 3\theta - \frac{\cos 9\theta}{3} + \frac{\cos 15\theta}{5} - \frac{\cos 21\theta}{7} + \frac{\cos 27\theta}{9} \cdots\right) \quad (2)$$

In similar fashion Expression 1 may be re-written for the fifth and seventh harmonic square waves by multiplying the $\theta$ values in Expression 1 by 5 and 7, respectively, as follows:

$$y_5 = \frac{4E}{\pi}\left(\cos 5\theta - \frac{\cos 15\theta}{3} + \frac{\cos 25\theta}{5} - \frac{\cos 35\theta}{7} + \frac{\cos 45\theta}{9} - \frac{\cos 55\theta}{11} + \frac{\cos 65\theta}{13} \cdots\right) \quad (3)$$

$$y_7 = \frac{4E}{\pi}\left(\cos 7\theta - \frac{\cos 21\theta}{3} + \frac{\cos 35\theta}{5} - \frac{\cos 49\theta}{7} + \frac{\cos 63\theta}{9} - \frac{\cos 77\theta}{11} + \frac{\cos 91\theta}{13} \cdots\right) \quad (4)$$

Dividing through each of Expressions 2, 3 and 4 by the orders of their respective harmonics gives:

$$\frac{y_3}{3} = \frac{4E}{\pi}\left(\frac{\cos 3\theta}{3} - \frac{\cos 9\theta}{9} + \frac{\cos 15\theta}{15} - \frac{\cos 21\theta}{21} + \frac{\cos 27\theta}{27} - \frac{\cos 33\theta}{33} + \frac{\cos 39\theta}{39} \cdots\right) \quad (5)$$

$$\frac{y_5}{5} = \frac{4E}{\pi}\left(\frac{\cos 5\theta}{5} - \frac{\cos 15\theta}{15} + \frac{\cos 25\theta}{25} - \frac{\cos 35\theta}{35} + \frac{\cos 45\theta}{45} - \frac{\cos 55\theta}{55} + \frac{\cos 65\theta}{65} \cdots\right) \quad (6)$$

$$\frac{y_7}{7} = \frac{4E}{\pi}\left(\frac{\cos 7\theta}{7} - \frac{\cos 21\theta}{21} + \frac{\cos 35\theta}{35} + \frac{\cos 49\theta}{49} - \frac{\cos 77\theta}{77} + \frac{\cos 91\theta}{91} \cdots\right) \quad (7)$$

Now if one combines the fundamental and harmonic expressions, reversing the sense of the fifth harmonic expression, it will be seen that a great many harmonic terms cancel out, providing a sinusoidal wave containing only limited amounts of high frequency components.

$$y_f + \frac{y_3}{3} - \frac{y_5}{5} + \frac{y_7}{7} = \left(\frac{\cos 11\theta}{11} + \frac{\cos 13\theta}{13} + \frac{\cos 15\theta}{15} + \frac{\cos 17\theta}{17} - \frac{\cos 19\theta}{19} - \frac{\cos 21\theta}{21} - \frac{\cos 23\theta}{23} + \frac{\cos 29\theta}{29} - \frac{\cos 31\theta}{31} + \frac{\cos 35\theta}{35} \cdots\right) \quad (8)$$

It will be seen from the Expression 8 that the resultant waveform contains no 3rd, 5th, 7th, 9th, 25th, 27th or 33rd harmonics whatsoever. Furthermore, removal of all of those harmonics will be seen not to have increased any other harmonics, as the harmonic contents of the following orders all remain the same as they were in the fundamental square wave: 11th, 13th, 15th, 17th, 19th, 21st, 23rd, 29th, 31st and 35th, although the phase of the following harmonics has been reversed: 15th, 21st, and 35th.

It is interesting to note that provision of a third harmonic square wave to cancel out the third harmonic content in the fundamental also automatically cancels out the ninth harmonic, and cancellation of the 5th automatically cancels out the 25th, so that removal of a given order harmonic appears also to remove harmonics of that order squared.

It will be noted that the fifth harmonic terms are subtracted from the fundamental while the third and seventh harmonic terms are added. If further square waves are superimposed to cancel out even higher order terms, it will be seen that whether they should be added or subtracted depends upon the sign of their associated term in the fundamental Expression 1. If a 13th harmonic square wave is used it should be subtracted, since the sign of the $$\cos\frac{13\theta}{13}$$

term in Expression 1 is positive.

The result of combining those square waves in the manner defined by Expression 8 will be evident from waveform *e* in FIG. 11, which waveform may readily be recognized to be a cosine wave with certain higher order harmonics. The zero degree point (peak value) of the cosine wave will be seen to correspond to the origin from which the angle θ has been measured.

In order that the fifth harmonic component be subtractive, it is only necessary that the state of flip-flop FF–5 initially be put out-of-phase or in opposite condition from the states of the other flip-flops in FIG. 10. Alternatively, it is possible to feed an inverted D.C. voltage to the emitter of transistor T–5, but this ordinarily might require an amplifier to invert the D.C. input voltage. To insure that the flip-flops begin each new cycle in proper relative states even if a noise pulse happens to accidentally switch one or more of them during a given cycle, the output lines of flip-flop FF–1 may be connected to apply transient pulses to the other three flip-flops at one or more times during each complete counting cycle of 210 counts. It will be seen from FIG. 11 that the states of flip-flops FF–3, FF–5, and FF–7 are opposite to that of FF–1 at the very beginning of a cycle (counts 1–14) and just after the mid-point (counts 106–119), just after flip-flop FF–1 has been switched by pulses from AND gate 15. Thus each output line from FF–1 may be connected through a small delay D and a capacitor C–1, C–2 to the control lines 24, 25 of the other three flip-flops to insure that they all are switched to a condition opposite to that of FF–1 just after the beginning and the mid-points of each counting cycle.

Figure 12:
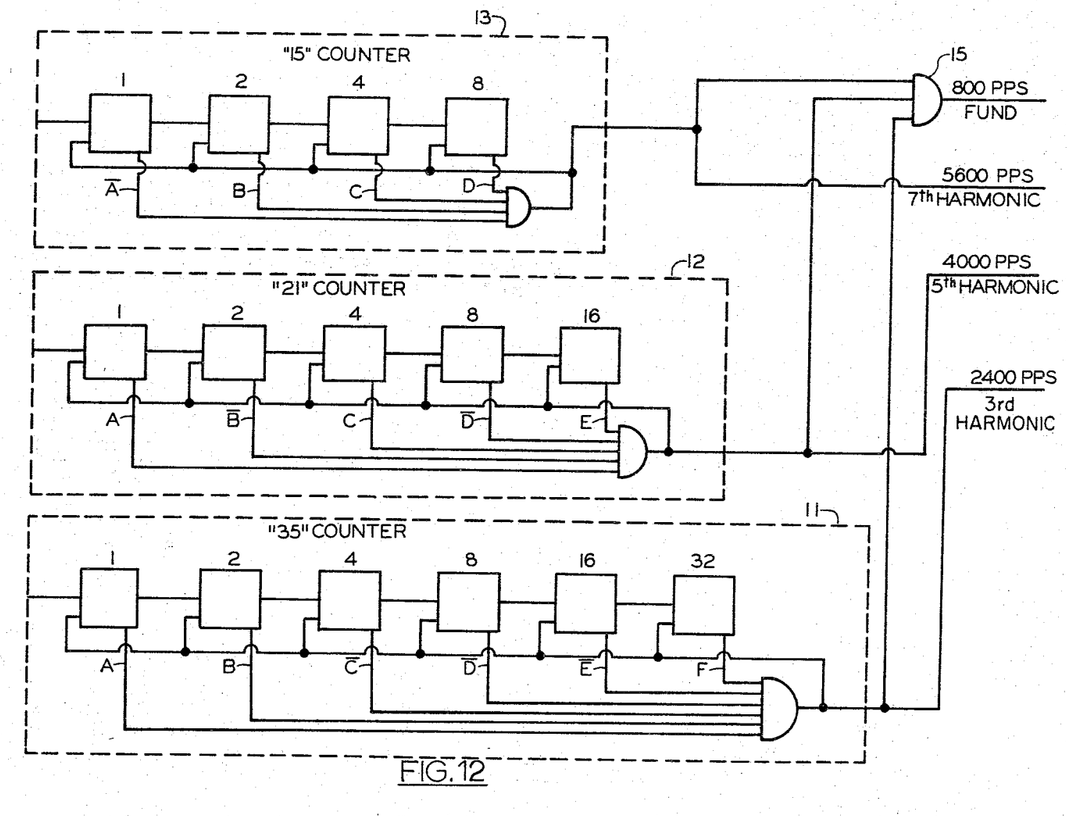
FIG. 12 is an electrical schematic diagram showing a counter portion of the apparatus of FIG. 10 in greater detail.

In FIG. 12 it will be seen that "15" counter 13 may comprise simply four binary flip-flops connected in a string to cycle through a complete counting cycle in 15 pulses. The "15" count is the same as the "zero" count, and hence the counter is adapted to be reset to zero upon occurrence of a fifteen count. When the right-hand sides of the second, third and fourth flip-flops of counter 13 are high and the left-hand side of the first flip-flop is high, as indicated by $\overline{A}BCD$ in FIG. 3, AND gate 30 enables reset line 31, resetting all four flip-flops to their reset condition $\overline{ABCD}$. The "21" counter 12 and the "35" counter 11 will be seen to operate similarly, cycling in 21 and 35 counts respectively.

The specific counter arrangement shown is exemplary only, and a wide variety of alternative counting and gating circuits may be substituted without departing from the invention. Ring counters, dekatron counters and numerous other counters may be used. Obviously in FIG. 10 separate counter capable of counting to 105 could be driven from OSC and AND gate 15 then omitted, but such a change would not appear to offer any advantages. While FIG. 10 shows three separate counters, it will be apparent that a single nine-stage binary counter (connected to reset after 210 counts) could be used, with gates connected to stages of such a counter to provide appropriate outputs to the flip-flops. In the simplified system of FIG. 10 both set and reset pulses are shown applied on the same line to each bi-stable flip-flop. Those skilled in the art will readily recognize that separate set and reset lines may be provided. In certain applications of the invention it may be desired to slave the alternating voltages produced by the apparatus of FIG. 10 to the phase and frequency of a reference source of alternating voltage. This may be done just as in FIG. 1, by applying both the reference voltage and an alternating voltage to a phase discriminator of conventional type to provide an error signal which varies in magnitude and polarity with the phase difference between the two alternating signals. The error signal then may be amplified to control the frequency of oscillator OSC, which in such an application preferably comprises a conventional voltage-controlled variable-frequency oscillator. Similar modifications and additions may be made to the alternate embodiment now to be described.

Figure 13:
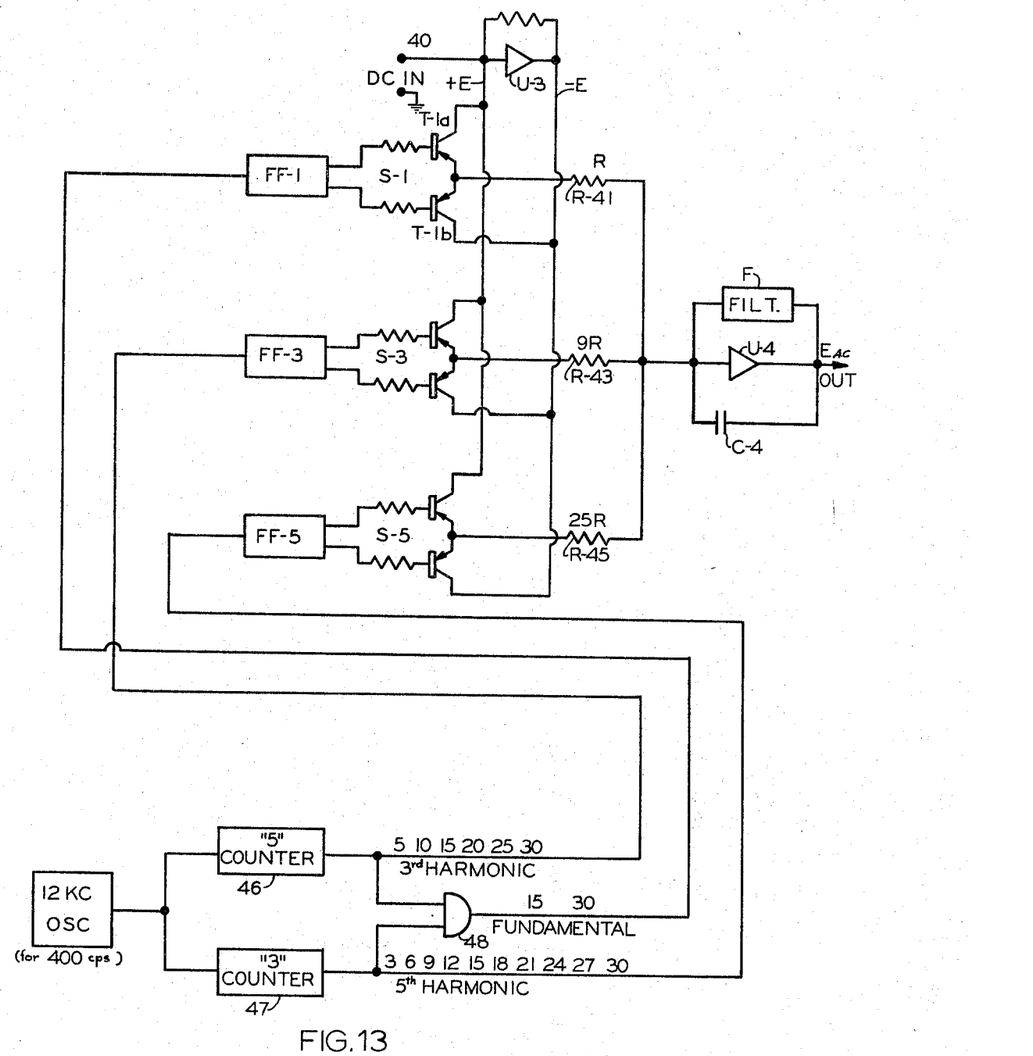
FIG. 13 is an electrical schematic diagram of yet another embodiment of the invention.
Figure 14:
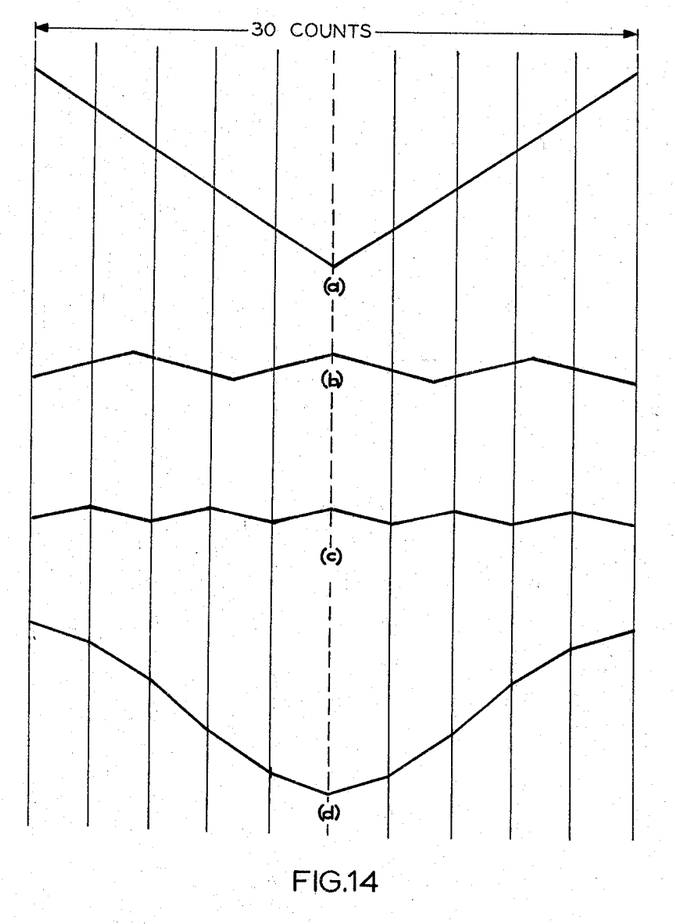
FIG. 14 shows various waveforms useful in understanding the operation of the apparatus of FIG. 13.

The further embodiment of the invention illustrated by FIGS. 13 and 14 may be regarded as utilizing the superimposition of triangular waves rather than square waves in order to provide alternating output voltages, although this is largely a matter of viewpoint if the output of the device of FIG. 10 is integrated. The triangular wave $y_t$ of fundamental frequency shown as waveform a in FIG. 14 may be defined by the following expression:

$$y_t = \frac{8E}{\pi^2}\left(\cos\theta - \frac{\cos 3\theta}{9} + \frac{\cos 5\theta}{25} + \frac{\cos 7\theta}{49} + \frac{\cos 9\theta}{81} \cdots\right)$$
(9)

It may be noted that all of the terms of the expression are of the same sign rather than having alternate plus and minus signs as in the case of square waves. Further, the denominators of the terms of the triangular wave series increase in accordance with the square of the order rather than proportionally as in the case of square waves, so that the magnitude of harmonic content in a triangular wave decreases rapidly at higher harmonics.

The values of the angle θ may be multiplied by 3 and 5 to provide expressions for $y_3$ and $y_5$, respectively, in the same manner as done above for the square waves, and then if one superimposes three triangular waves in accordance with the following expression, it will be seen that an alternating wave having no third, fifth or ninth harmonic content will be obtained.

$$y_t - y_3 - \frac{y_5}{25} = \frac{8E}{\pi}\left(\cos\theta + \frac{\cos 7\theta}{49} + \frac{\cos 11\theta}{121} + \frac{\cos 13\theta}{169} + \cdots\right)$$
(9)

If one chose to superimpose also a $-y_7/49$ triangular wave, the seventh harmonic would also be eliminated, and also further harmonics, just as in the case of the square waves illustrated above. Each additional channel provided to eliminate a particular harmonic requires an increase in equipment, of course, particularly in the counting apparatus used to sub-divide one fundamental cycle into a plurality of bit periods, since the counting apparatus must count during each fundamental cycle through an even number which is divisible by each order of harmonic for which a channel is provided.

In the apparatus of FIG. 13 the direct voltage to be converted is provided in both polarities, a conventional unity-gain inverting feedback amplifier U–3 being shown to invert the direct input voltage applied to terminal 40. The +E and −E voltages are routed to three single-pole double-throw transistor switches S–1, S–3 and S–5. When a voltage flip-flop FF–1 is applied to the base of transistor T–1 of switch S–1, the plus E voltage is applied via resistor R–41 to an integrating circuit shown as comprising amplifier U–4 and feedback capacitor C–4. When flip-flop FF–1 is in its opposite stage, a negative voltage applied to the base of transistor T–1b results in the −E voltage being applied via resistor R–41 to the integrator. Switches S–3 and S–5 are similarly controlled by flip-flops FF–3 and FF–5 respectively.

If transistors T–1a and T–1b are alternately gated on and off they will be seen to provide alternate positive and negative voltages of equal magnitude via resistance R–41 to the integrator, and it will be apparent that integration of such a square wave input will provide a triangular wave. The slope of the triangular wave, and hence its peak value, will be seen to be determined by the magnitude of the input voltage E and the value of resistance R–41. In similar manner flip-flops FF–3 and FF–5 are operated to gate 3rd and 5th harmonic square waves to the integrator to provide 3rd and 5th harmonic triangular wave components in the integrator output. Since the third and fifth harmonic components must subtract from the fundamental, flip-flops FF–3 and FF–5 are arranged so as to be in a stage opposite from that of FF–1 at the origin of a cycle.

Flip-flops FF–1, FF–3 and FF–5 are driven in FIG. 13 in a manner similar to their counterpart flip-flops in FIG. 10 by a counting apparatus which advances through one complete counting cycle during one alternating voltage cycle. One cycle in the apparatus of FIG. 4 is divided into 30 counts, 30 being the lowest even number divisible by both 3 and 5, the harmonics for which cancellation channels are provided in FIG. 13. If a seventh harmonic channel were desired, a counting cycle of 210 would be provided as in FIG. 10. To provide a 400 c.p.s. output, a 12 kc. oscillator (400 times 30=12,000) is connected to cycle a "5" counter 46 to provide outputs at counts 5, 10, 15, 20, 25 and 30 of a cycle, and a "3" counter 47 to provide outputs at 3, 6, 9, 12, 15, 18, 21, 24, 27 and 30 counts. The outputs of counters 46 and 47 are applied to AND gate 48 to provide outputs at counts of 15 and 30. The output signals from AND gate 48, counter 46 and counter 47 are applied to control the states of flip-flops FF–1, FF–3 and FF–5, thereby to provide square wave inputs to the integrator. The three square wave inputs, if integrated separately would provide the waveforms shown at $a$, $b$ and $c$ in FIG. 5, and being combined and integrated, they provide the output shown at $d$ in FIG. 5. The integrating means is shown provided with filter F in its feedback path. Filter F may comprise a simple and inexpensive filter which can greatly attenuate the already-small 7th, 11th, 13th and higher order harmonics while causing little fundamental loss.

A variety of possible modifications or additions to FIG. 13 will become apparent to those skilled in the art upon a perusal of this disclosure. For example, it will be readily apparent that the output lines of FF–1 in FIG. 4 may be connected in the same manner as in FIG. 10 to check the other flip-flop states twice during each complete counting cycle.

In the most usual applications of the invention wherein one desires to remove all harmonics and provide a pure fundamental, the advantages of the invention are most easily obtained by superimposing periodic waveforms which are skew-symmetrical, i.e., contain only odd-order harmonics, of which the most common and easily produced are the square wave and triangular wave. It is possible, however, to eliminate harmonics by superimposing other periodic waveforms, such as the sawtooth wave, which contains odd and even harmonics, as shown by the following expression commonly used for sawtooth waves.

$$y = \frac{2E}{\pi}\left(\sin\theta - \frac{\sin 2\theta}{2} + \frac{\sin 3\theta}{3} - \frac{\sin 4\theta}{4} + \frac{\sin 5\theta}{5} \cdots \right)$$

If one provides a fundamental sawtooth $y_f$ and a plurality of harmonically related sawtooth voltages, one may eliminate lower order harmonics by combining them as follows:

$$\text{Sum} = y_f + \frac{y_2}{2} - \frac{y_3}{3} + \frac{y_4}{4} - \frac{y_5}{5} - \frac{y_6}{6} \cdots$$

Such a system will be seen to require much more equipment if one wishes solely to produce a pure fundamental. If, however, one were interested only in removing a particular one or a few harmonics, say only the 6th harmonic, and was not concerned with the other harmonic content, one might well chose to superimpose periodic waves having both even and odd terms.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Apparatus for converting a variable direct voltage input signal into an alternating voltage of a desired frequency and of an amplitude linearly proportional to the magnitude of said direct voltage input signal, comprising in combination: switching means for modulating said direct voltage input signal to provide sequences of pulses each having an amplitude commensurate with the instantaneous magnitude of said direct voltage; filter means connected to filter said pulses to provide said alternating voltage; and control means for controlling the operation of said switching means, said control means including first means for controlling said switching means to modulate said direct voltage at said desired frequency and second means for controlling said switching means to further modulate said direct voltage at a plurality of predetermined time periods during each half-cycle of said desired frequency, said further modulation at said predetermined time periods serving to decrease the content in said pulses of selected harmonics of said desired frequency.

2. Apparatus for converting a variable direct voltage into a sinusoidal alternating voltage having a desired fundamental frequency and an amplitude linearly proportional to the magnitude of said variable direct voltage, comprising, in combination: a pair of terminals adapted to receive said variable direct voltage; switching means adapted to connect said direct voltage and a reference level potential alternately to a third terminal; filter means connected to said third terminal and operable to provide said alternating voltage; and timing means for controlling the operation of said switching means to connect said direct voltage and said reference level potential each to said third terminal for a plurality of predetermined time periods during each cycle of said desired frequency.

3. Apparatus according to claim 2 in which said timing means comprises pulse-generating means operable to provide a first train of pulses; a re-cycling pulse-counting means operable to count the pulses of said first train and to provide counter output signals commensurate therewith; and a logic circuit including a plurality of gate means for providing control signals at predetermined count conditions of a cycle of said re-cycling pulse counter means, said control signals being connected to control the operation of said switching means.

4. Apparatus according to claim 3 further comprising further filter means connected to filter said control signals to provide a second alternating voltage; phase detector means responsive to said second alternating voltage and a reference alternating voltage and operable to provide a second control signal commensurate with the direction and amount of phase displacement between said second alternating voltage and said reference voltage; and circuit means for applying said second control signal to control the frequency of said pulse-generating means.

5. Apparatus according to claim 3 in which the pulse repetition rate of said pulse-generating means is arranged to cycle said pulse-counting means through one complete cycle during one complete cycle of said desired fundamental frequency.

References Cited

UNITED STATES PATENTS 2,990,516    6/1961    Johannessen.
3,194,979    7/1965    Toy _______________ 307—88.5

FOREIGN PATENTS 1,065,080    9/1959    Germany.

JOHN F. COUCH, *Primary Examiner.*

W. H. BEHA, *Assistant Examiner.*